United States Patent
Knapp et al.

[11] Patent Number: 6,143,985
[45] Date of Patent: *Nov. 7, 2000

[54] CABLE RELEASING AND RETRACTING SYSTEM FOR REPRODUCTION MACHINE MODULAR COMPONENTS

[75] Inventors: Lowell W. Knapp, Victor; Sam E. Stewart, Rochester, both of N.Y.

[73] Assignee: Xerox Corporation, Stamford, Conn.

[*] Notice: Under 35 U.S.C. 154(b), the term of this patent shall be extended for 1121 days.

[21] Appl. No.: 08/609,670

[22] Filed: Mar. 1, 1996

Related U.S. Application Data

[63] Continuation of application No. 08/187,981, Jan. 28, 1994, abandoned.

[51] Int. Cl.$^7$ ........................................... H01B 7/06
[52] U.S. Cl. ................. 174/69; 174/DIG. 9; 191/12 R; 242/388.9
[58] Field of Search ................ 174/69, DIG. 9; 191/12 R, 12.2 R, 12 C; 242/47.5

[56] References Cited

U.S. PATENT DOCUMENTS

| | | | |
|---|---|---|---|
| 2,648,052 | 8/1953 | Graham et al. | 191/12 R X |
| 2,730,183 | 1/1956 | Svoboda | 191/12 R X |
| 2,984,714 | 5/1961 | Kunkle | 191/12 R |
| 4,691,806 | 9/1987 | Jansen et al. | 242/47.5 X |

OTHER PUBLICATIONS

Xerox Disclosure Journal vol. 2, No. 3 May/Jun. 1977 p. 29 Author: Above.

*Primary Examiner*—Hyong Sab Sough
*Attorney, Agent, or Firm*—Andrew D. Ryan

[57] ABSTRACT

In a reproduction machine with modular components movable relative to the mainframe of the machine, a cable controlling system for maintaining a protected electrical cable interconnection when the modular component is moved relative to the mainframe, with a constant force spring system connecting a pulley cable guide to the mainframe to retract the pulley cable guide towards the mainframe when the modular component is moved towards the mainframe, and to allow the pulley cable guide to move away from the mainframe with the substantially constant force when the modular component is moved away from the mainframe, a single bight in the cable of a defined minimum relatively large wrap angle, and a linear cable guide channel member internally confining a substantial portion of the extendable and retractable single bight portion of the cable.

1 Claim, 2 Drawing Sheets

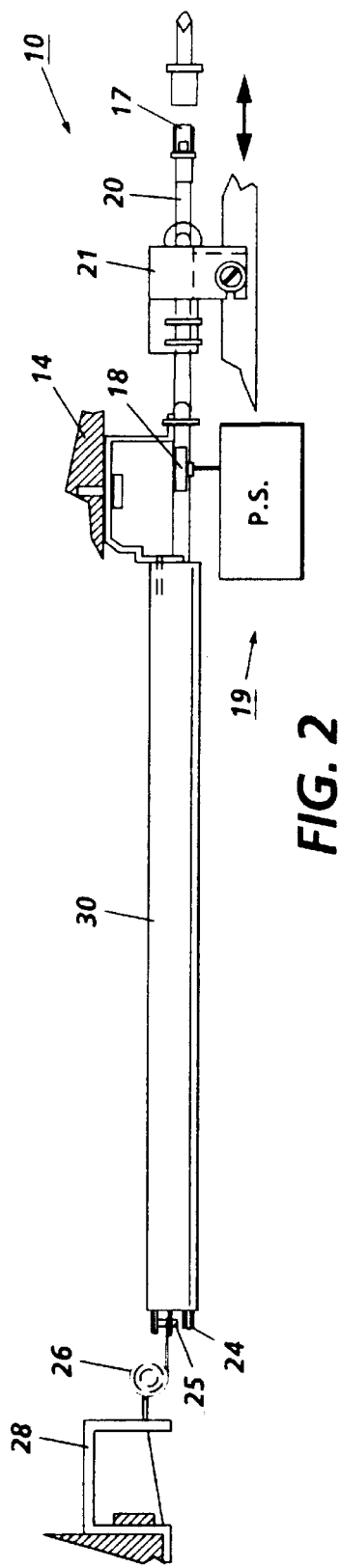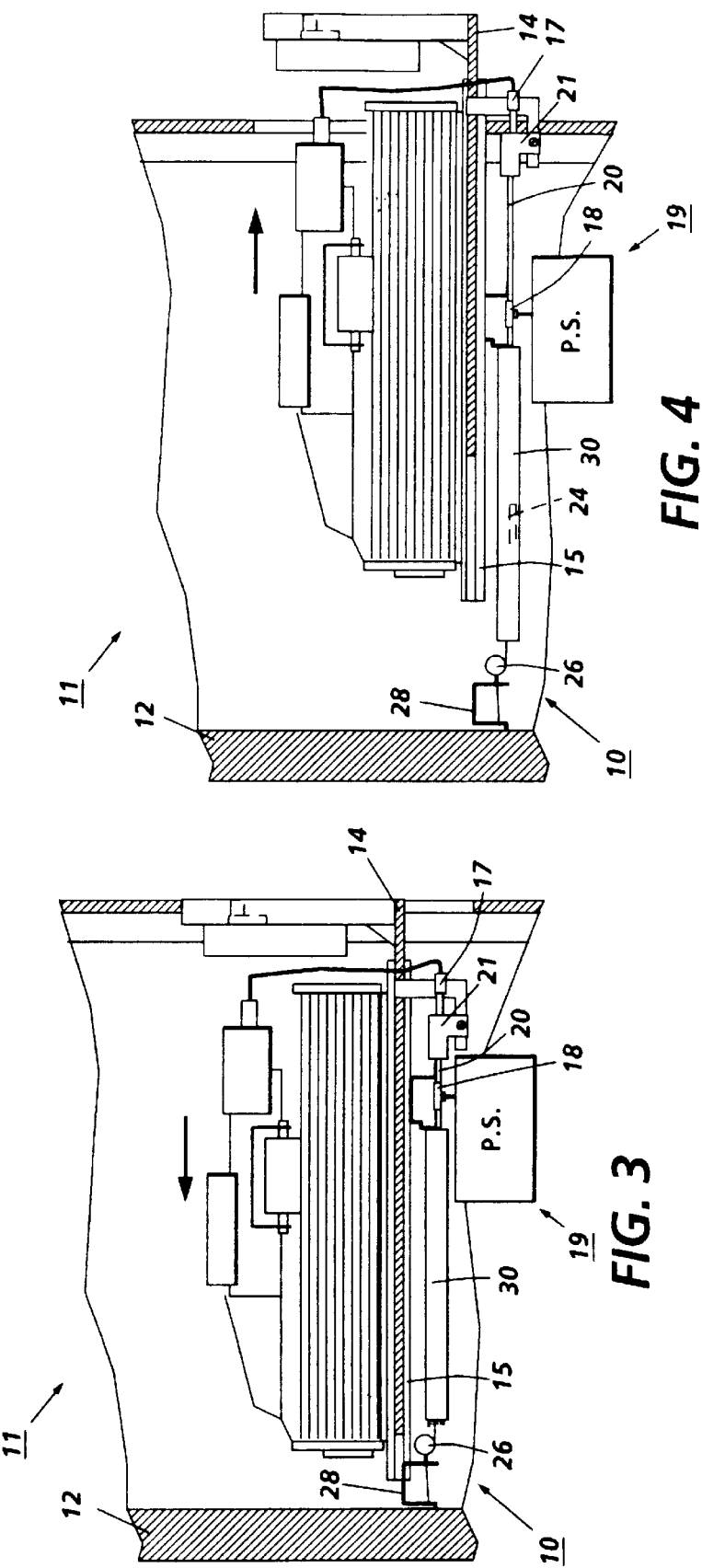

CABLE RELEASING AND RETRACTING SYSTEM FOR REPRODUCTION MACHINE MODULAR COMPONENTS

This is a continuation of application Ser. No. 08/187,981, filed Jan. 28, 1994, now abandoned.

The disclosed system provides for improved electrical wire or cable connection to movable components, such as the slide out drawers or other modular components of a reproduction apparatus. The disclosed cable releasing and retracting system provides improved release and control over an interconnecting cable as modular components are moved out relative to the rest of a machine, and improved retraction and control of the cable as the modular components are moved inwardly toward the machine.

In particular, there is disclosed in this embodiment a simple and low cost system for protecting an interconnecting cable during such component movements by the desirable features of maintaining a low and constant force on the cable, maintaining only a single partial wrap or bend in the cable of a defined minimum wrap angle and relatively large cable bend radius, for cable over-flex and flex fatigue protection, and maintaining a defined, controlled, known cable position, throughout the cable extension and contraction, so that no hanging loop or variably extending portion of the cable can become caught, entangled or damaged by the moving module or any other moving components of the machine.

In the disclosed embodiment a fully defined, substantially linear, extendable and retractable cable bight or loop may be provided at all times by automatically holding this extendible/retractable portion of the cable within a linear protective channel member. This protective channel member may be mounted on or parallel to or made as a part of an otherwise conventional drawer mounting rail on which the drawer or other modular component may slide in and out of the machine without disconnecting the interconnecting cable to the machine.

It may be seen that substantial advantages are provided in various of the above-noted and other respects over conventional multi-wind or reel type spring loaded cable retractors by the system disclosed herein.

It will be appreciated that the term "flexible cable" is used broadly herein and may include one or more signal communications and/or power cables of single or multiple wires, coaxial cables, fiber optics, etc., of various shapes and/or sizes.

Of particular background art interest is Xerox Disclosure Journal publication Vol. 2, No. 3, May/June 1977, p. 29 by Charles E. Abare entitled "Electrical Tape Tensioner", although this is not a constant force or confined cable system.

A specific feature of the specific embodiment disclosed herein is to provide in a reproduction machine with at least one modular component of the machine which is movable relative to the mainframe of the machine and has an electrical interconnection between said mainframe of the machine and said modular component by at least one flexible electrical cable, with one end of said cable connected to said mainframe and the other end of said cable connected to said modular component, the improvement in a cable releasing and retracting system for maintaining said electrical cable interconnection when said modular component is moved relative to said mainframe, comprising: a pulley cable guide of a substantial defined radius around which an intermediate portion of said electrical cable is only partially wrapped once to form a single bight portion in said cable of a defined minimum relatively large wrap angle, said bight portion of said cable being extendable and retractable by extendable and retractable movement of said modular component relative to said mainframe; a substantially constant force spring system connecting said pulley cable guide to said mainframe to retract said pulley cable guide towards said mainframe when said modular component is moved towards said mainframe, and to allow said pulley cable guide to move away from said mainframe with said substantially constant force when said modular component is moved away from said mainframe; and a cable guide channel member confining a substantial portion of said extendable and retractable single bight portion of said cable which is extending to and from said pulley cable guide within said cable guide channel member for maintaining a defined and controlled position of said cable bight portion during said extendable and retractable movement of said modular component relative to said mainframe.

Further specific features provided by the system disclosed herein, individually or in combination, include those wherein said cable guide channel member is substantially linear and elongated; and/or wherein said movable modular component is a linear slide out drawer; and/or wherein said cable releasing and retracting system is mounted substantially parallel to the linear slide out direction of said drawer; and/or wherein said cable guide channel member is mounted on and extends parallel to a drawer mounting rail on which said slide out drawer is slideably mounted; and/or wherein said substantially constant force spring system comprises at least one self winding metal tape constant force spring.

As to specific hardware components of the subject apparatus, or alternatives therefor, it will be appreciated that, as is normally the case, some such specific hardware components are known per se in other apparatus or applications which may be additionally or alternatively used herein.

Various of the above-mentioned and further features and advantages will be apparent from the specific apparatus and its operation described in the examples below, as well as the claims. Thus, the present invention will be better understood from this description of these embodiments thereof, including the drawing figures (approximately to scale) wherein:

FIG. 2 is a side view of the system of FIG. 1;

FIG. 3 is a reduced size side view of the system of FIGS. 1 and 2 showing more of an exemplary associated drawer; and FIG. 4 is similar to FIG. 3, showing the drawer partially open.

Figure 1:
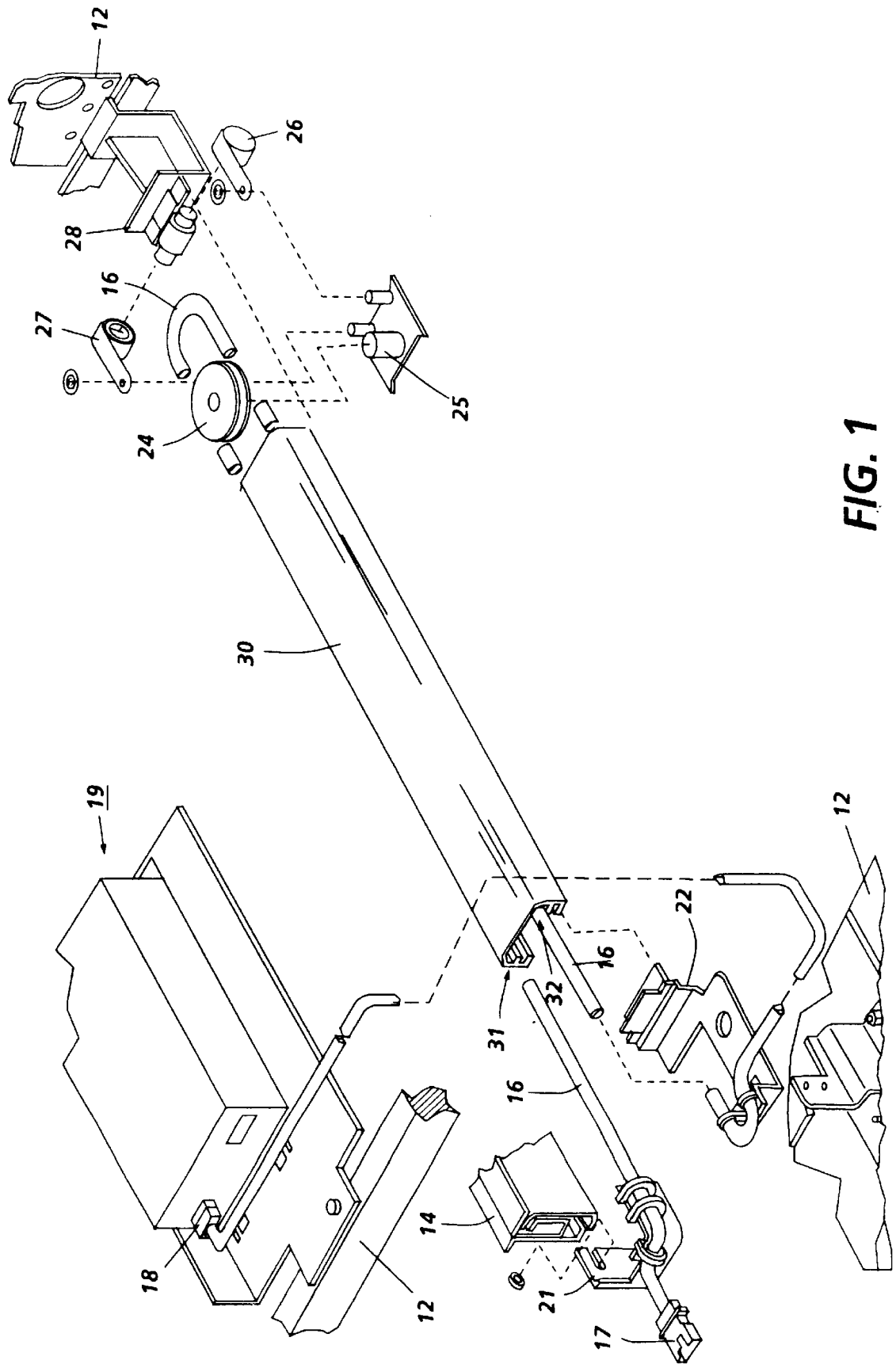
FIG. 1 is a partially exploded perspective view of an exemplary flexible cable releasing and retracting system in accordance with the present invention, showing portions of an exemplary reproduction machine and its slideable drawer which are electrically interconnected by the electrical cable of this system.

Referring now to the particular example shown in the Figures, there is shown a cable releasing and retracting system 10 for use in an exemplary reproduction apparatus 11 such as a xerographic copier or printer having a mainframe 12 and one or more slide out drawers 14 mounted on drawer rails 15 at each side thereof to the mainframe 12. It will be appreciated that this is merely one example of one application of this system. For example, while a conventional paper feeding drawer 14 is illustrated herein requiring cable connected electrically driven paper feeders and electrical paper feeding sensors, that the present system of cable maintenance and connection to movable components can be used for various other modular units, for example a slide out fuser module, slide out developer unit, or other movable modules of a reproduction apparatus. Most reproduction machines have several modular components which are movable relative to the mainframe of the machine. Yet it is desired to maintain an uninterrupted electrical interconnection between the mainframe of the machine and many such modular components by at least one flexible electrical cable. The alternative is to require the operator to unplug or otherwise disconnect the electrical connections between the movable module and the mainframe of the machine each time the module is pulled out. That is not only time consuming, it is easy to overlook and thus relatively easy to damage the connectors. Multi-pin connectors which the operator or tech rep may attempt to insert in the wrong manner may be damaged during reconnection. Furthermore, if the electrical cable (which as noted above can encompass various wiring systems) is either not controlled properly during the opening and closing of the modular component relative to the mainframe or, worse yet, is left hanging disconnected, the cable and/or its connectors may easily be inadvertently crushed, sheared, or otherwise damaged by the movement of the module relative to the mainframe. In addition to such direct damage by impact, shearing or pinching of the cable or its connectors where the cable is allowed to hang in an uncontrolled or unconfirmed manner within the machine, there is the problem of metal conductor fatigue. That is, when a cable is flexed in a sharp radius over many openings and closings of the modular component of the machine the conductors inside the cable can become fatigued and fracture. As is well known, this not only can cause interruptions of signals or electrical power on an intermittent basis, which is difficult to detect. Also, a power circuit conductor interrupt can cause arcing or burning of the cable at the point of wire breakage.

In contrast, in the present system, the cable 16 is maintained at all times in a controlled position where it is out of the way of all other moving components and cannot be directly damaged, and wherein is also maintained with a controlled minimum wrap angle for over-flexing protection.

By way of example, here the cable 16 is connected to the front of the drawer 14 by a standard electrical connector 17 at one end of the cable 16. The other end of the cable 16 is connected by another standard electrical connector 18 to the power supply 19 of the machine 11, where it is in turn electrically connected to the power supply and/or controller 19 at another location on the mainframe 12. Electrical continuity is maintained through the cable 16 at all positions of the slide out drawer 14. There is no need to disconnect the cable 16 unless special diagnostic procedures are required.

It may be seen that in the system 10 the cable is maintained in a single large cable loop or bight 20 at all times. One end of the cable bight 20 is mechanically held by a conventional drawer cable bracket 21 to the slide out drawer 14 and the other end of this cable bight 20 is held by a mainframe cable bracket 22. The intermediate loop end defining the bight 20 is provided by a movable pulley 24. The pulley 24 is rotatably mounted on a pulley shaft mounting plate 25. This mounting plate 25 is in turn secured to the free ends of of constant force or "negator" springs 26 and 27. These springs are preferably of a known commercially available type comprising an elongated self-winding metal tape. These springs 26, 27 are in turn mounted to a springs mounting bracket 28 which is secured to the mainframe 12. The result is that the pulley 24 and by its mounting 25 is free to move outwardly away from the mainframe 12 but is constantly pulled toward the mainframe 12 by the extended tapes of the constant force springs 26 and 27.

Thus, as the drawer 14 is slid out from the mainframe 12, the drawer side of the cable bight 20 freely moves out with the drawer 14 and pulls additional cable for that movement from the other side of the cable bight 12, which correspondingly pulls the pulley 24 away from the mainframe 12 against the constant low tension provided by the constant force springs 26 and 27. (It will be appreciated that a single spring could be utilized instead, if desired.)

Thus, the entire cable 16 connection between the mainframe cable bracket 22 and the drawer cable bracket 21 is maintained in a single linear bight 20 of two variable length sides under the constant tension of the springs 26, 27. This not only provides control over the cable 16, it also ensures that the minimum wrap radius of the cable 16 is that of the diameter of the pulley 24, which, as shown, has a substantial diameter, much larger than that of the cable 16.

However, as may be seen, in the system 10 even further positional control and protection is provided for the interconnecting cable 16 between the movable modular unit and the reproduction apparatus. This is provided by the cable guide channel member 30, which may be, as shown, a linear metal or plastic extrusion with cable holding channels such as 31, 32 on the interior thereof. There is also an intitial cable inserting opening which is provided here by making the channel member 30 in an open "U" shaped section. Both of the two sides of the cable bight 20 here, or at least a substantial length thereof, are desirably maintained within, and protected by the channel member 30, by lying within the cable holding channels 31, 32 inside the channel member 30, which at least partially holds or support the cable 16 bight 20. Alternatively, channels 31, 32 may be provided by simple inwardly projecting lips on an otherwise simple U-shaped channel member.

The channel member 30 may be desirably mounted parallel to or even directly on the drawer portion of the drawer rail 15, or other portion of the slide out drawer 14. This desirably maintains the cable 16 and the movement of the pulley 12 closely spaced from the drawer 14 so as not to occupy any substantial interior space in the apparatus 11. Also, to insure that no part of the cable will be exposed to damage by other components.

By providing both the pulley 24 and its mounting 25 of a smaller diameter than the interior or cross-sectional dimensions of the channel member 30, it may be seen that these components 24, 25, and the connecting end portion of the springs 26, 27 may also move inside the channel member 30 for at least part of its length, and thus also be protected within the channel member 30.

It may be seen that the above system 10 provides improved release and control over the interconnecting electrical cable as the modular component is moved out relative to the rest of the machine, an improved retraction and control of the cable as that modular component is moved inwardly toward the machine. A low and constant force is maintained on the cable and the cable is always maintained with only single wrap or bend in the cable of a defined minimum wrap angle of a relatively large radius. No portion of the interconnecting cable is allowed to hang or variably extend in an uncontrolled manner which could become caught, entangled or damaged.

While the embodiment disclosed herein is preferred, it will be appreciated from this teaching that various alternatives, modifications, variations or improvements therein may be made by those skilled in the art, which are intended to be encompassed by the following claims:

What is claimed:

1. A reproduction machine with a mainframe and at least one modular component comprising a slide out drawer movable in a linear direction of movement towards and away from said mainframe and an electrical cable interconnection between said mainframe and said modular component comprising at least one flexible electrical cable with one end of said flexible cable connected to said mainframe and the other end of said cable connected to said modular component, and an improved releasing and retracting system for protecting said electrical cable interconnection when said modular component is moved towards and away from said mainframe, said cable releasing and retracting system being mounted substantially parallel to the linear direction of said slide drawer, said cable releasing and retracting system including a fixed radius pulley cable guide around which an intermediate portion of said electrical cable is only partially wrapped once to form a single bight portion in said cable with a minimum cable flexure radius defined by said radius of said pulley cable guide, and a substantially constant force spring system connecting said pulley cable guide to said mainframe to retract said pulley cable guide towards said mainframe when said modular component is moved towards said mainframe, and to allow said pulley cable guide to move away from said mainframe with said substantially constant force when said modular component is moved away from said mainframe, so that said bight portion of said cable is extendible and retractable by said movement of said modular component towards and away from said mainframe with said substantially constant force; and a substantially linear and elongated but partially open sided C shaped cable guide and protective channel member partially surrounding most of said extendible and retractable single bight portion of said cable, providing a continuous cable access opening therealong, said C shaped channel member also loosely confining said pulley cable guide therein but allowing linear movement of said pulley cable guide within said C shaped cable guide, said C shaped channel member being open at a first open end to allow the ends of said bight portion of said cable to extend linearly from said first open end of said C shaped channel member towards said modular component, and said C shaped channel member being open at a second open end to allow said constant force spring system to extend from said second open end towards said mainframe, continuously during said linear movement of said modular component towards and away from said mainframe.

* * * * *